(12) United States Patent
Shannon

(10) Patent No.: US 7,157,710 B1
(45) Date of Patent: Jan. 2, 2007

(54) CORONA DISCHARGE DETECTION

(75) Inventor: Robert A. Shannon, Leominster, MA (US)

(73) Assignee: Kaiser Systems, Inc., Beverly, MA (US)

( * ) Notice: Subject to any disclaimer, the term of this patent is extended or adjusted under 35 U.S.C. 154(b) by 63 days.

(21) Appl. No.: 10/988,052

(22) Filed: Nov. 12, 2004

Related U.S. Application Data

(60) Provisional application No. 60/523,365, filed on Nov. 19, 2003.

(51) Int. Cl.
- G01J 5/02 (2006.01)
- G01J 1/42 (2006.01)
- G01J 3/30 (2006.01)
- G01R 31/08 (2006.01)

(52) U.S. Cl. ............... 250/339.05; 250/372; 250/395; 324/535; 356/313

(58) Field of Classification Search ........... 250/339.05; 324/535, 536
See application file for complete search history.

(56) References Cited

U.S. PATENT DOCUMENTS

| 5,075,629 | A | * | 12/1991 | Umemura et al. | 324/547 |
| 5,373,241 | A | * | 12/1994 | Ham et al. | 324/536 |
| 5,513,002 | A | * | 4/1996 | Shapanus et al. | 356/313 |
| 5,886,344 | A | * | 3/1999 | Forsyth | 250/226 |
| 6,104,297 | A | * | 8/2000 | Danilychev | 340/600 |
| 6,150,652 | A | * | 11/2000 | Forsyth | 250/226 |
| 6,323,491 | B1 | * | 11/2001 | Forsyth | 250/372 |
| 6,476,396 | B1 | * | 11/2002 | Forsyth | 250/372 |

* cited by examiner

Primary Examiner—David Porta
Assistant Examiner—Frederick F. Rosenberger
(74) Attorney, Agent, or Firm—Philip O. Post

(57) ABSTRACT

An apparatus and process are provided for detecting whether a corona discharge has occurred external or internal to equipment in which a broadband optical spectra sensor is placed. The broadband optical spectra sensor senses both the ultraviolet energy of the corona discharge and the infrared energy of afterglow of the discharge when the discharge occurs internal to the equipment. The sensed broadband optical spectra signal is processed and a determination is made as to whether the corona discharge occurred external or internal to the equipment from the pulse width of the sensed energy pulse.

14 Claims, 5 Drawing Sheets

CORONA DISCHARGE DETECTION

CROSS REFERENCE TO RELATED APPLICATIONS

This application claims the benefit of U.S. Provisional Application No. 60/523,365 filed Nov. 19, 2003, the entirety of which is incorporated herein by reference.

FIELD OF THE INVENTION

The present invention generally relates to corona (arc) discharge detection, and in particular, to arc detection and discrimination as to whether the arc occurred within equipment in which the arc is sensed by a broadband optical spectra sensor, or within a component electrically connected to the equipment.

BACKGROUND OF THE INVENTION

U.S. Pat. No. 6,104,297 discloses a corona discharge detection system for detecting a defect in a high voltage cable, transformer or other piece of high voltage equipment. An optical sensor generates an electrical signal in response to the detection of ultraviolet radiation in a prescribed range from a discharge. The sensor is selected for discrimination of the sensed ultraviolet from sun radiation.

U.S. Pat. No. 6,476,396 discloses an electro-optical, non-contact measurement of electrical discharges. Optical filtering is used to pass selected wavelengths of ultraviolet, visible or near-infrared light from a discharge to a light-collecting optical detector with high sensitivity at the selected wavelengths. A signal processor analyzes the output of the optical detector with a matched filter technique or a pulse-height analyzer.

An arc discharge may occur internally within a high voltage power supply, or in an external component (such as a cable or x-ray tube) electrically connected to the power supply. The above prior art may be used to detect and locate an arc discharge, but is not capable of determining whether the discharge occurred within a high voltage power supply, or an external component, when the arc discharge sensor is provided within the power supply. Consequently, if the discharge occurs in an external component connected to the power supply, a technician who is troubleshooting the source of the arc may replace one or more power supplies before he or she realizes that the arc is occurring in the external component. Therefore there is the need for a corona discharge detector with a sensor disposed within a high voltage power supply, or other high voltage component, that will sense whether the corona discharge (arcing) has occurred internally in the high voltage component or in an external component electrically connected to the high voltage component.

BRIEF SUMMARY OF THE INVENTION

In one aspect, the present invention is an apparatus for, and method of, sensing a corona discharge with at least one broadband optical spectra sensor located in equipment to determine whether the discharge originated in the equipment or an external component connected to the equipment. The broadband optical spectra sensor senses both the ultraviolet energy of the corona discharge and the infrared energy of the afterglow caused by a corona discharge in the equipment. A signal processor processes the sensed broadband optical spectra signal and evaluates whether the corona discharge has occurred external or internal to the equipment on the basis of the time period of the sensed energy pulse.

Other aspects of the invention are set forth in this specification.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

It has been experimentally observed that when an corona discharge occurs in a component electrically connected to a power supply, such as but not limited to, a high voltage power supply (i.e., output voltage greater than 300 volts), a substantially ultraviolet pulse of short duration occurs within the power supply. The ultraviolet pulse is believed to be due to partial electrical discharge within the dielectric, such as an oil, gas or vacuum system, used within the power supply. By way of example and not limitation, this ultraviolet pulse may have a duration of no more than a few microseconds (generally under 10 microseconds).

When the arc occurs within the power supply, the arc energy generates extreme localized heating of the dielectric that results in a broadband optical pulse of much greater duration than that sensed within the power supply for an external arc. The duration of the energy pulse created from an internal arc is generally observed to be on the order of tens or hundreds of microseconds. However by use of the broadband (ultraviolet through infrared) optical spectra sensing of the present invention, both this short duration ultraviolet pulse and a longer duration infrared pulse resulting from an internal arc is sensed and processed. The longer duration pulse is believed to be caused by infrared afterglow resulting from a corona discharge within the power supply.

Figure 1A:
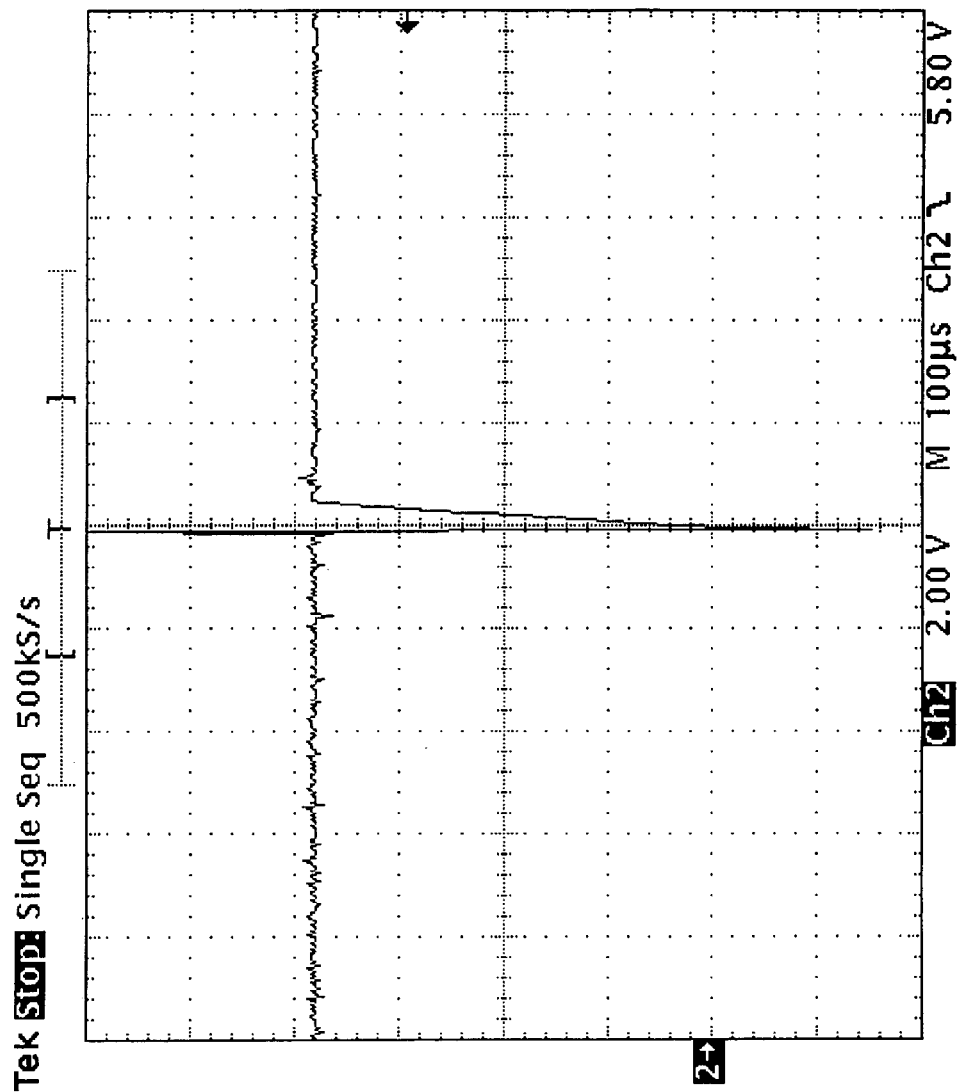
FIG. 1(a) is one example of an energy pulse from an arc generated in an external component connected to a high voltage power supply and sensed by a broadband optical spectra sensor located in the power supply.
Figure 1B:
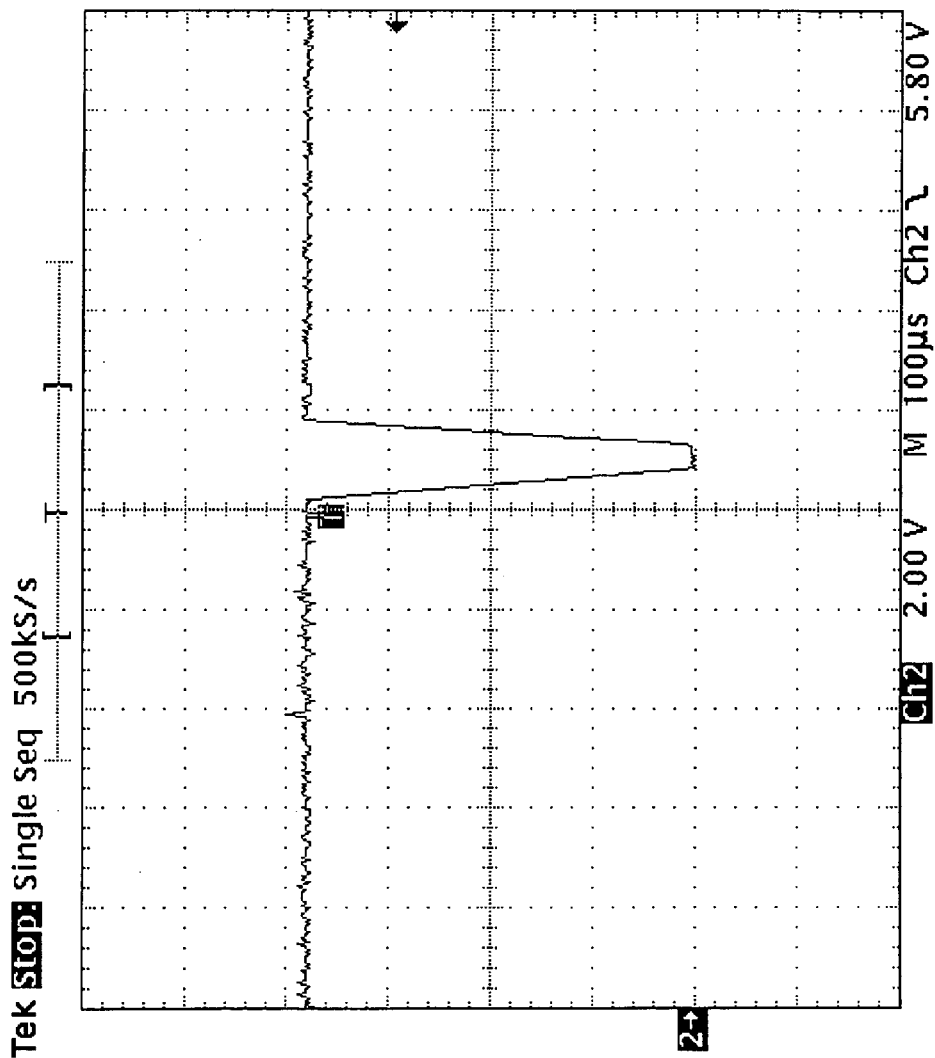
FIG. 1(b) is one example of an energy pulse from an arc generated internally in a high voltage power supply and sensed by a broadband optical spectra sensor located in the power supply.
Figure 1C:
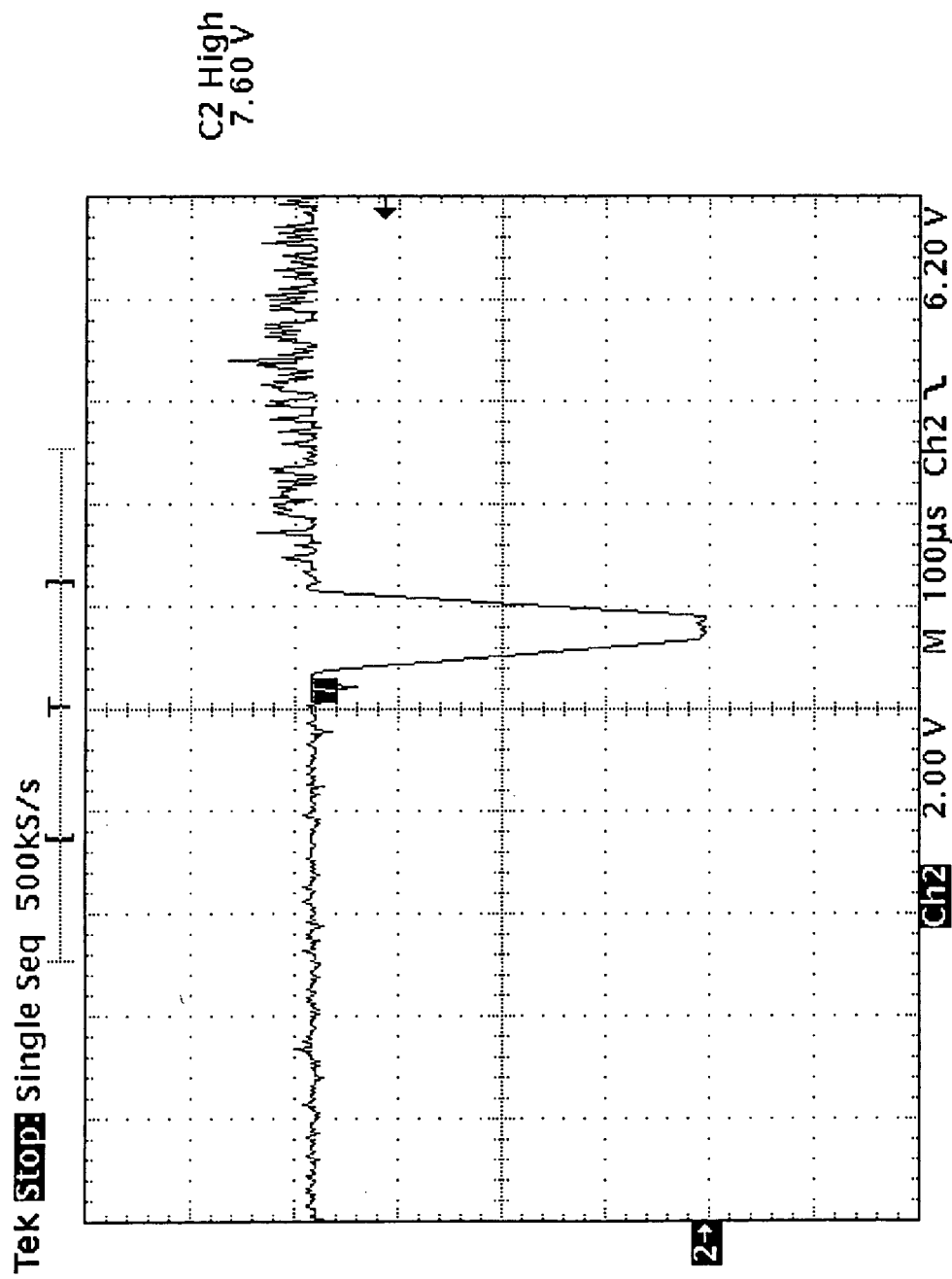
FIG. 1(c) is another example of an energy pulse from an arc generated internally in a high voltage power supply and sensed by a broadband optical spectra sensor located in the power supply.

Further illustrating the above, FIG. 1(a) represents a broadband optical spectra energy pulse sensed internal to a power supply from an externally created 150-kVolt line to ground arc. In this example the duration is approximately 20 microseconds and the pulse's peak voltage is approximately 10.6 volts. As noted above this pulse represents ultraviolet energy from a partial discharge within the power supply. FIG. 1(b) represents a broadband optical spectra energy pulse sensed internal to a power supply from an internally created 150-kvolt line to ground arc. In this example the duration is approximately 80 microseconds and the pulse's peak voltage is approximately 6.8 volts. As noted above this pulse largely represents infrared afterglow energy resulting from the corona discharge within the power supply. FIG. 1(c) represents a broadband optical spectra energy pulse sensed internal to a power supply from an internally created arc at a lower voltage (20-kVolts arc with a 180-kVolt line) when the sensor in the power supply is located some distance away from the actual physical location of the discharge (12 inches in this example). This lower voltage is more representative of a corona (partial) discharge within the power supply. In this example the duration is approximately 45 microseconds and the pulse's peak voltage is approximately 6.8 volts. FIG. 1(a) through FIG. 1(c) illustrate that a broadband optical spectra pulse with a substantially greater pulse width will be sensed within a power supply when the corona discharge is internal to the power supply than when the discharge occurs in an external component connected to the power supply. By using a single broadband optical spectra sensor within the power supply, detection of a corona discharge and determination of whether the discharge is internal or external to the power supply can be accomplished by the present invention.

Figure 2:
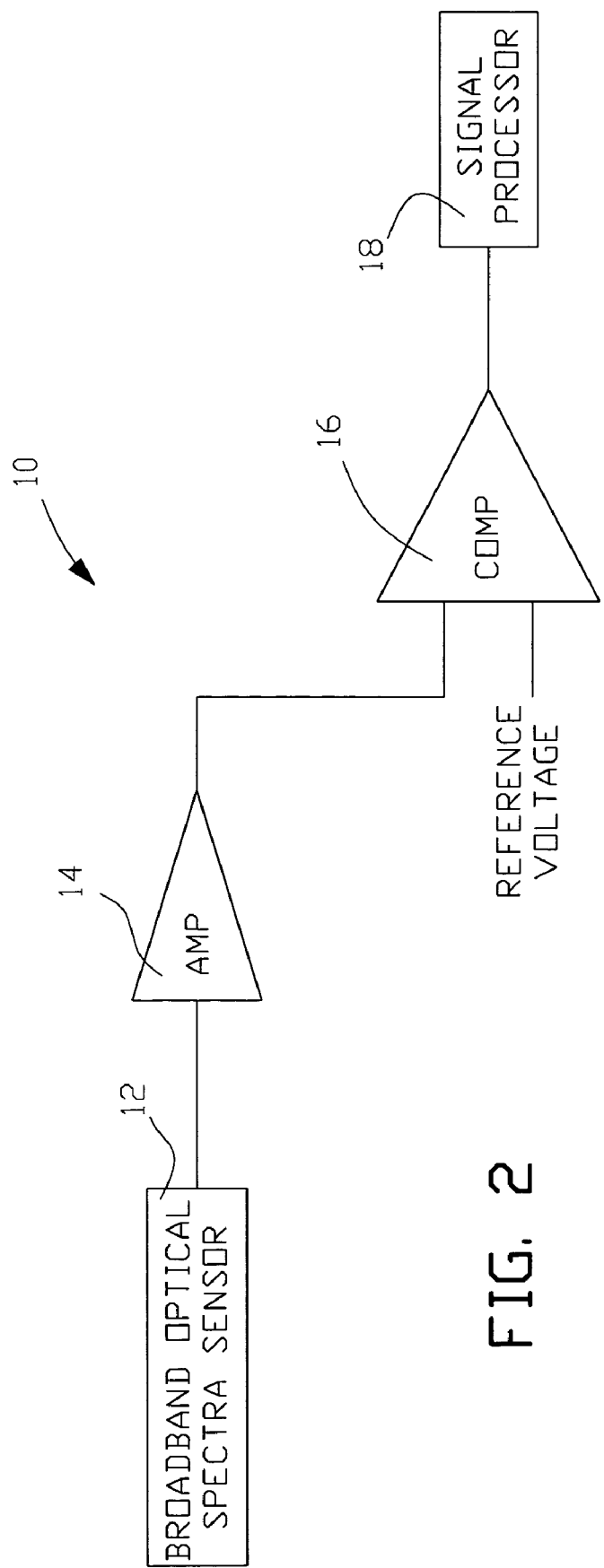
FIG. 2 is a simplified electrical block diagram of one example of the corona discharge detector of the present invention.

Referring now to the drawings, wherein like numerals indicate like elements, there is shown in FIG. 2, one example of a simplified electrical block diagram of the corona (arc) discharge detector 10 of the present invention. Broadband optical spectra sensor 12 can be any broadband optical spectra sensor that will sense both the ultraviolet energy produced by a corona discharge and the infrared energy produced by the infrared afterglow from a corona discharge within the power supply. The sensor outputs a signal level that is proportional to the sensed energy. One non-limiting example of a suitable broadband optical spectra sensor is a blue sensitive photodiode available from Sharp Microelectronics of the Americas (Camas, Wash.) as part no. BS520. In other applications sensors with a greater sensitivity in the ultraviolet and/or infrared regions may be used.

Amplifier 14 amplifies the broadband optical spectra output signal of the sensor, if required, and inputs the amplified optical spectra output signal to comparator 16. The comparator compares the amplified output signal with a fixed reference voltage (false output signal level) that is set to a suitable voltage level to avoid false detection of energy pulses. For example, for the power supply and external components with the arc energy characteristics shown in FIG. 1(a) and FIG. 1(b), the fixed reference voltage may be fixed at 2.0 volts to avoid false detection of the low level noise voltage pulses shown in those figures. The digital output of the comparator changes state when the voltage amplitude of the broadband optical spectra output signal exceeds the fixed voltage, and will remain in that state until the voltage amplitude of the broadband optical spectra output signals drops below the fixed voltage. Signal processor 18 senses the state change of the output of the comparator and calculates the period of time until the next state change output of the comparator. This calculated period of time is equal to the pulse width of the broadband optical spectra signal at the fixed reference voltage level as sensed by sensor 12. Signal processor 18 compares the calculated time period with a preset time period to determine whether the arc is internal (calculated time period greater than the preset time period) or external (calculated time period less than or equal to the preset time period). The preset time period is selected to be within the time range between the time period expected for an external arc broadband optical spectra energy pulse and an internal arc broadband optical spectra energy pulse. For example, for the power supply and external components with the arc energy characteristics shown in FIG. 1(a) and FIG. 1(b), where the broadband optical spectra energy pulse for an external arc has a time period of approximately 20 microseconds (FIG. 1(a)) and the broadband optical spectra energy pulse for an internal arc has a time period of approximately 80 microseconds (FIG. 1(b)), the preset time period may be selected as 30 microseconds. One skilled in the art can make quantitative measurements for other configurations of high voltage components to determine appropriate selection of the preset time period that represents the minimum pulse width of an energy pulse for a discharge originating in the high voltage component. Upon making the determination as to whether the arc is internal or external, the signal processor may transmit the results to suitable indicator and/or control circuitry, such as one or more indicator lights, or an audible alarm, to indicate whether the arc is internal or external to the power supply and/or to shut down the power supply if the arc is internal to the supply. Signal processor 18 may be any suitable microprocessor that can execute a computer program based on algorithms for performance of the above calculations.

One broadband sensor may be used in a power supply. The broadband sensor for a particular application need only sense a frequency band broad enough for the substantially ultraviolet arc energy pulse and substantially infrared afterglow to be expected in a particular application. A particular configuration of power supply and external components may be tested to determine the required sensed frequency range for that specific arrangement. Alternatively a combination of two separate sensors to separately sense the ultraviolet energy pulse of an arc and the infrared afterglow of an arc internal to the power supply may be used. In other examples of the invention two or more broadband optical spectra sensors may be located within the power supply to allow more sophisticated processing of the sensed broadband optical spectra pulse. For example time and magnitude displacement of the sensed energy pulse from sensors at different locations within the power supply may be processed by signal processor 18 to further discriminate as to whether the arc is internal or external to the power supply.

Figure 3A:
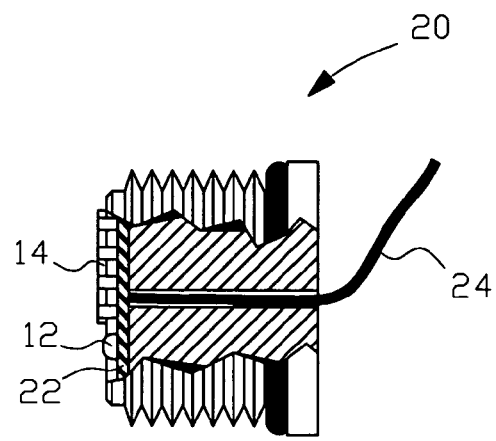
FIG. 3(a) through FIG. 3(c) illustrate one example of the corona discharge detector of the present invention.
Figure 3B:
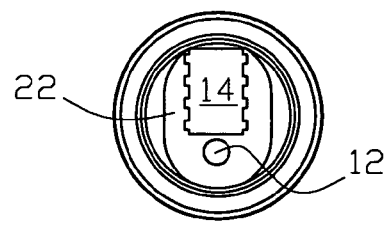
Figure 3C:
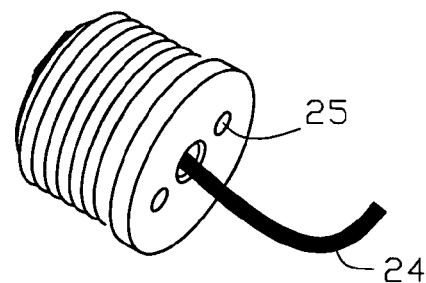

FIG. 3(a) through FIG. 3(c) illustrate one non-limiting example of a corona discharge detector of the present invention wherein at least some of the components of the detector are contained in a fitting placed in the enclosure of the power supply. In this arrangement, the power supply enclosure (not shown in the figures) incorporates a threaded opening to accommodate threaded fitting or plug 20. For example if the power supply uses an oil system as the dielectric medium, the threaded opening may be an opening for an oil fill or drain plug. In this example, components of the detector are incorporated into fill or drain plug 20. Printed circuit board 22 is fabricated to fit in the base of plug 20. Broadband sensor 12 and amplifier 14 are mounted on circuit board 22. Cable 24 connects the output of amplifier 14 to a comparator that, in this non-limiting example of the invention, is remotely located from the amplifier, along with signal processing circuitry. Cable 24 is also used to supply power to the sensor and amplifier. In other examples of the invention, a compact battery may be incorporated into plug 20 to provide power to the sensor and amplifier. Further, in other examples of the invention, the comparator and signal processing circuitry may be incorporated in the plug, and one or more indicator lights 25 may also be provided on the head of the plug to provide a totally self-contained corona discharge detector in accordance with the present invention. Alternatively one or more broadband sensors 12 may be located with the enclosure of the power supply with other selected components of the corona discharge detector of the present invention.

In this specification the term "ultraviolet" is used to define electromagnetic energy with wavelength from about 4 nanometers to about 380 nanometers, and the term "infrared" is used to define electromagnetic energy with wavelength from about 750 nanometers to about 1 millimeter. Further the term "optical spectra" is used to describe the electromagnetic spectra for wavelengths in the ultraviolet, visible and infrared regions as required to encompass both the corona discharge energy and the afterglow caused by a corona discharge within a power supply.

While the corona discharge detector 10 of the present invention is described in the above examples as being installed in a power supply to discriminate between internal and external arc discharges, detector 10 may be installed in other electrical equipment (high voltage component), for example a transformer, to determine whether a corona discharge has occurred internal or external to the other equipment without deviating from the scope of the invention.

The examples of the invention include reference to specific electrical components. One skilled in the art may practice the invention by substituting components that are not necessarily of the same type but will create the desired conditions or accomplish the desired results of the invention. For example, single components may be substituted for multiple components or vice versa. Circuit elements without values indicated in the drawings can be selected in accordance with known circuit design procedures. Whereas a comparator is used as a means for optical sensor signal evaluation to compare the optical sensor output signal level with a false output signal level, other suitable devices may be used. Whereas in the example above a cable is used to connect the optical sensor output signal from the sensor to remotely located comparator and signal processor, in other examples of the invention, other means for providing the optical sensor output signal to the remotely located components, such as radio transmission, may be used.

The foregoing examples do not limit the scope of the disclosed invention. The scope of the disclosed invention is further set forth in the appended claims.

The invention claimed is:

1. An apparatus for determining whether a corona discharge originated within a high voltage component or a second component electrically connected to the high voltage component, the apparatus comprising:
   a broadband optical spectra sensor for sensing the ultraviolet energy produced by the corona discharge in the high voltage component and for sensing the infrared energy produced by the infrared afterglow from the corona discharge in the high voltage component, the broadband optical spectra sensor having an optical sensor output signal level proportional to the sensed energy;
   a means for optical sensor signal evaluation for comparing the optical sensor output signal level with a false output signal level to determine if the optical sensor output signal level is greater than the false output signal level, the means for optical sensor signal evaluation having a valid optical signal output during the period of time that the optical sensor output signal level is greater than the false output signal level; and
   a signal processor for calculating a valid optical signal period of time that the optical sensor output signal level is greater than the false output signal level and for comparing the valid optical signal period of time with a minimum pulse width for a corona discharge within the high voltage component to determine whether the corona discharge occurred in the high voltage component or the second component connected to the high voltage component.

2. The apparatus of claim 1 further comprising a means for audibly or visually indicating whether the corona discharge has occurred in the high voltage component.

3. The apparatus of claim 1 further comprising a means for de-energizing the high voltage component if the corona discharge occurred in the high voltage component.

4. An apparatus for determining whether a corona discharge originated within a high voltage component or a second component electrically connected to the high voltage component, the apparatus comprising:
   a fitting inserted into an opening in an enclosure of the high voltage component;
   a broadband optical spectra sensor attached to the fitting to sense the ultraviolet energy produced by the corona discharge in the high voltage component and for sensing the infrared energy produced by the infrared afterglow from the corona discharge in the high voltage component, the broadband optical spectra sensor having an optical sensor output signal proportional to the sensed energy;
   a means for optical sensor signal evaluation attached to the fitting for comparing the optical sensor output signal level with a false output signal level to determine if the optical sensor output signal level is greater than the false output signal level, the means for optical sensor signal evaluation having a valid optical signal output during the period of time that the optical sensor output signal level is greater than the false output signal level; and
   a signal processor attached to the fitting for calculating a valid optical signal period of time that the optical sensor output signal level is greater than the false output signal level and for comparing the valid optical signal period of time with a minimum pulse width for a corona discharge within the high voltage component to determine whether the corona discharge occurred in the high voltage component or the second component connected to the high voltage component.

5. The apparatus of claim 4 further comprising a means for indicating whether the corona discharge has occurred in the high voltage component to provide a visual or audible signal external to the high voltage component.

6. An apparatus for determining whether a corona discharge originated within a high voltage component or a second component electrically connected to the high voltage component, the apparatus comprising:
   an at least one fitting inserted into an opening in an enclosure of the high voltage component;
   a broadband optical spectra sensor attached to each of the at least one fitting to sense the ultraviolet energy produced by the corona discharge in the high voltage component and for sensing the infrared energy produced by the infrared afterglow from the corona discharge in the high voltage component, the broadband optical spectra sensor having an optical sensor output signal proportional to the sensed energy;
   a means for providing the optical sensor output signal from the broadband optical spectra sensor attached to each of the at least one fitting to a means for optical sensor signal evaluation located remotely from each of the at least one fitting for comparing the optical sensor output signal level with a false output signal level to determine if the optical sensor output signal level is greater than the false output signal level, the means for optical sensor signal evaluation having a valid optical signal output during the period of time that the optical sensor output signal level is greater than the false output signal level; and a signal processor located remotely from each of the at least one fitting for calculating a valid optical signal period of time that the optical sensor output signal level is greater than the false output signal level and for comparing the valid optical signal period of time with a minimum pulse width for a corona discharge within the high voltage component to determine whether the corona discharge occurred in the high voltage component or the second component connected to the high voltage component.

7. The apparatus of claim 6 further comprising a means for audibly or visually indicating whether the corona discharge has occurred in the high voltage component.

8. The apparatus of claim 6 further comprising a means for de-energizing the high voltage component if the corona discharge occurred in the high voltage component.

9. A method of determining whether a corona discharge originated within a high voltage component or a second component electrically connected to the high voltage component, the method comprising the steps of:

sensing the ultraviolet energy pulse produced by the corona discharge within the high voltage component and the infrared energy pulse produced by the infrared afterglow from the corona discharge within the high voltage component with a broadband optical spectra sensor to produce an optical sensor output signal proportional to the sensed energy pulses;

determining the time period of the sensed energy pulse;

determining whether the time period of the sensed energy pulse is greater than or equal to a minimum pulse width for an energy pulse from a corona discharge within the high voltage component; and if the time period of the sensed energy pulse is not greater than or equal to the minimum pulse width for an energy pulse from a corona discharge within the high voltage component, correlating the determination with a corona discharge originating in the second component electrically connected to the high voltage component.

10. The method of claim 9 further comprising the step of providing a visual or audible indication if the time period of the sensed energy pulse is greater than the minimum pulse width for an energy pulse from a corona discharge within the high voltage component.

11. The method of claim 9 further comprising the step of de-energizing the high voltage component if the time period of the sensed energy pulse is greater than the minimum pulse width for an energy pulse from a corona discharge within the high voltage component.

12. A method of determining whether a corona discharge originated within a high voltage component or a second component electrically connected to the high voltage component, the method comprising the steps of:

sensing the ultraviolet energy pulse produced by the corona discharge within the high voltage component and the infrared energy pulse produced by the infrared afterglow from the corona discharge within the high voltage with a broadband optical spectra sensor to produce an optical sensor output signal proportional to the sensed energy pulses;

comparing the signal level of the sensed energy pulse with a false output signal level;

generating a valid energy pulse signal for the period of time that the level of the sensed energy pulse is greater than the false output signal level;

determining the time period of the valid energy pulse;

determining whether the time period of the valid energy pulse is greater than or equal to a minimum pulse width for an energy pulse from a corona discharge within the high voltage component; and if the time period of the sensed energy pulse is not greater than or equal to the minimum pulse width for an energy pulse from a corona discharge within the high voltage component, correlating the determination with a corona discharge originating in the second component electrically connected to the high voltage component.

13. The method of claim 12 further comprising the step of providing a visual or audible indication if the time period of the valid energy pulse is greater than the minimum pulse width for an energy pulse from a corona discharge within the high voltage component.

14. The method of claim 12 further comprising the step of de-energizing the high voltage component if the time period of the valid energy pulse is greater than the minimum pulse width for an energy pulse from a corona discharge within the high voltage component.

* * * * *